(12) United States Patent  (10) Patent No.: US 6,964,529 B2
Chien  (45) Date of Patent: Nov. 15, 2005

(54) ORIENTATION-ADJUSTABLE OPTICAL TRANSCEIVER MODULE

(76) Inventor: Hui-Chueh Chien, No. 148, Chung-Lin, Chung-Lin Li, Ta Lin Chen, Chia-Yi Hsien (TW)

( * ) Notice: Subject to any disclaimer, the term of this patent is extended or adjusted under 35 U.S.C. 154(b) by 146 days.

(21) Appl. No.: 10/619,468

(22) Filed: Jul. 16, 2003

(65) Prior Publication Data

US 2005/0013552 A1    Jan. 20, 2005

(51) Int. Cl.[7] ................................................. G02B 6/36
(52) U.S. Cl. ........................... 385/88; 385/25; 385/81; 385/90; 385/92; 385/93
(58) Field of Search ............................ 385/25–26, 31, 385/33–38, 76–87, 88, 90–94, 52

(56) References Cited

U.S. PATENT DOCUMENTS 4,291,942 A * 9/1981 Henry et al. ................... 385/94
5,631,987 A * 5/1997 Lasky et al. ................... 385/88
6,812,057 B2 * 11/2004 Tanaka ........................ 438/55
6,827,506 B2 * 12/2004 Chen ........................... 385/93
6,837,625 B2 * 1/2005 Schott et al. ................. 385/60

* cited by examiner

Primary Examiner—Frank G. Font
Assistant Examiner—Ryan Lepisto
(74) Attorney, Agent, or Firm—Troxell Law Office, PLLC

(57) ABSTRACT

An optical transceiver module including a sleeve, a base, and an adjustable toggle. The sleeve extends from the base and is inserted by an optical fiber. The base is formed with a receiving hole. The toggle is coaxially arranged within the receiving hole. The toggle has a penetrating hole for combining with an optical transceiver element. The toggle is installed with an annular flange for adjusting the orientation of the optical transceiver element. A spring is installed in the receiving hole so that the orientation of optical transceiver module is adjustable to any direction. Thereby a light from a laser diode is precisely focused to a core of an optical fiber.

1 Claim, 3 Drawing Sheets

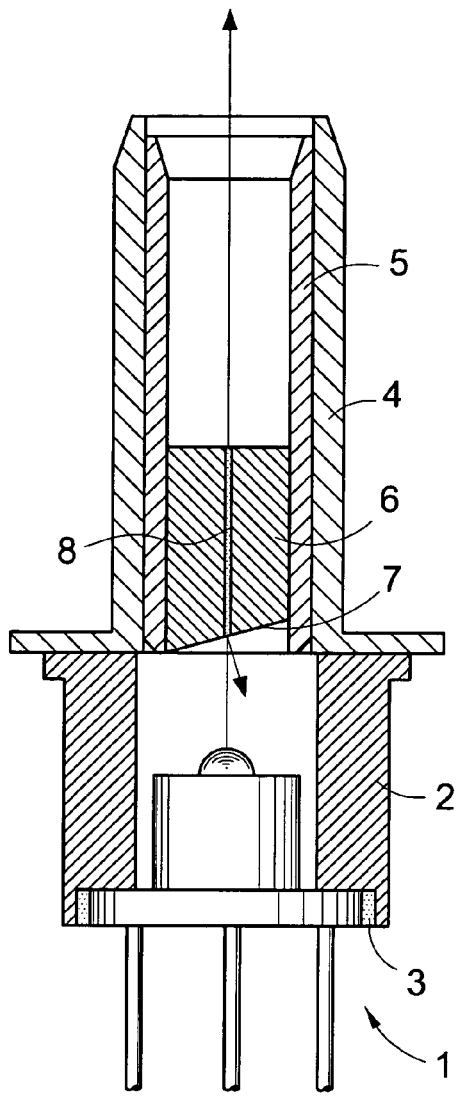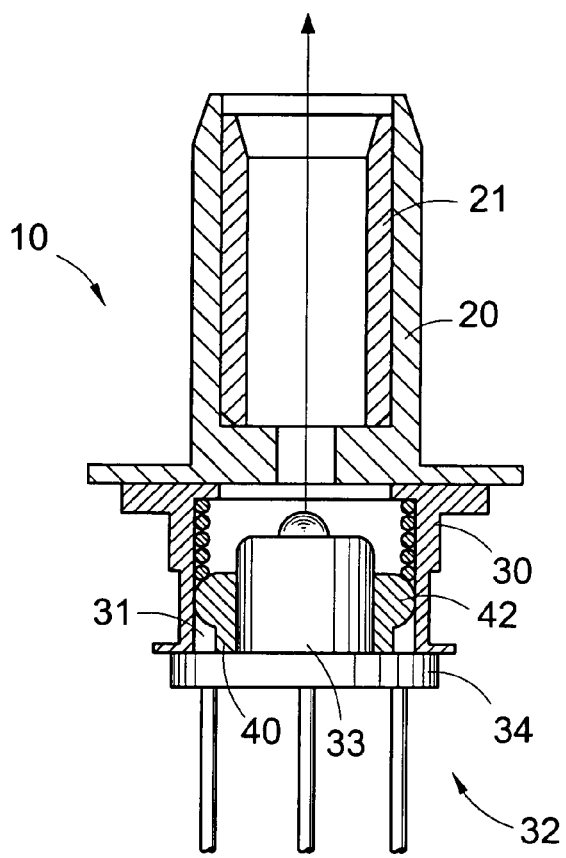
FIG.1
PRIOR ART
FIG.2

ORIENTATION-ADJUSTABLE OPTICAL TRANSCEIVER MODULE

FIELD OF THE INVENTION

The present invention relates to optical transceivers, and particularly to an orientation-adjustable optical transceiver module so that light from a laser diode can be focused to a core of an optical fiber. Thereby, the present invention can reduce the volume in the operation of optical fiber coupling and improve the coupling efficiency between optical fiber and optical detector. As a result, cost is reduced.

BACKGROUND OF THE INVENTION

In the current optical communication system, laser diodes are used as light sources. After packaging, the laser diode and the package structure is formed as a laser diode element. Referring to FIG. 1, the laser diode element 1 is installed in a metal base 2 by using a fixing glue 3 as a fixing material. A hollow sleeve 4 is combined to the base 2. A hollow ceramic tube 5 is coaxially arranged in the sleeve 4. A cylindrical ceramic cover 6 is coaxially arranged within the ceramic tube 5. A distal end of the cover 6 is ground to have an inclined plane 7 for preventing reflecting light from radiating to the laser diode so that the laser diode is interfered by noises. Furthermore, the cover 6 is coaxially arranged with an optical fiber 8 so that the light radiated from the laser diode element 1 exactly focuses to the core of the optical fiber 8. However, the sleeve 4 can be combined to the joint of the optical fiber. Then the parallel light beams in the optical fiber 8 is guided to the core of another optical fiber at the side of the joint.

Thereby, by above packaging structure, an optical transmitting module is formed. If above said laser diode element 1 is replaced by an optical detector. Then an optical receiving module is formed. However to have a higher coupling efficiency, a longer length is necessary for coupling the light from the laser diode to the optical fiber so as to focus light to the core of an optical fiber. That is to say, the sleeve 4 will make the coupling volume of the laser diode and optical fiber is too larger and much of the light energy is lost in transmission. This is inconvenient in operation. Furthermore, the distance between the light emitting position of the laser diode and the end surface of the optical fiber is too long to be align easily. Moreover, the sleeve 4 is made of ceramic material. Thus, the cost is high.

SUMMARY OF THE INVENTION

Accordingly, the primary object of the present invention is to provide an optical transceiver module which comprises a sleeve, a base, and an adjustable toggle. The base is formed with a receiving hole. The toggle is coaxially arranged with the receiving hole. The toggle is coaxially arranged within the receiving hole. The toggle has a penetrating hole for combining with an optical transceiver element. The toggle is installed with an annular flange for adjusting the orientation of the optical transceiver element. A spring is installed in the receiving hole so that the orientation of optical transceiver module is adjustable to any direction. Thereby a light from a laser diode is precisely focused to a core of an optical fiber.

The various objects and advantages of the present invention will be more readily understood from the following detailed description when read in conjunction with the appended drawing.

BRIEF DESCRIPTION OF THE DRAWINGS

FIG. 1 is a cross section view of the prior art optical transceiver module.

FIG. 2 is a cross section view of the optical transceiver module of the present invention.

DETAILED DESCRIPTION OF THE PREFERRED EMBODIMENTS

Figure 3:
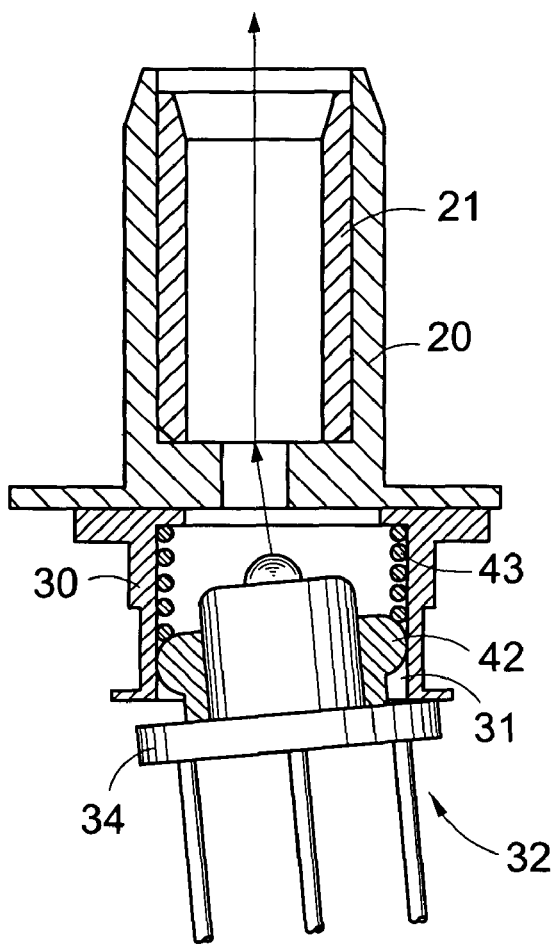
FIG. 3 is a cross section view showing a focused and adjusted optical transceiver element according to the present invention.
Figures 4, 4A:
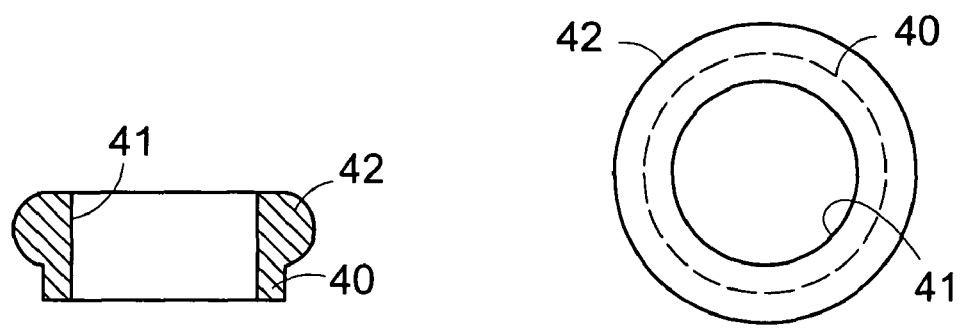
FIGS. 4 and 4A is a cross section view and an elevational view showing the adjustment of the sleeve of the present invention.

Referring to FIGS. 2 to 4A, the optical transceiver module 10 of the present invention includes a sleeve 20, a base 30, and an adjustable toggle 40. An hollow ceramic tube 21 is coaxially arranged in the sleeve 20.

The base 30 is formed with a receiving hole 31. The toggle 40 is coaxially arranged with the receiving hole 31. The toggle 40 has a penetrating hole 41 for combing with the casing 33 of an optical transceiver element 32 (for example, a laser diode, and a detector).

The toggle 40 is installed with an annular flange 42 which is in contact with an inner wall surface of the receiving hole 31 and a seat 34 of the optical transceiver element 32 can be fixed by a dedicated fixture for focusing and adjusting the orientation so as to achieve a minimum insertion loss and return loss. Finally, laser welding is used to combine the sleeve 20, base 30, and toggle 40 together so that the optical transceiver element 32 is fixed to an optimum orientation (referring to FIG. 3).

A spring 43 is installed on the receiving hole 31. Thereby, the optical transceiver element 32 can be adjusted in any orientation. Thus, light beam from the laser diode is focused to the core of an optical fiber. Moreover, the spring 43 causes the sleeve 20 to be tightly engaged to the base 30. Thus, adjustment of orientation can be performed without using a movable platform of a laser welding machine.

Figure 5:
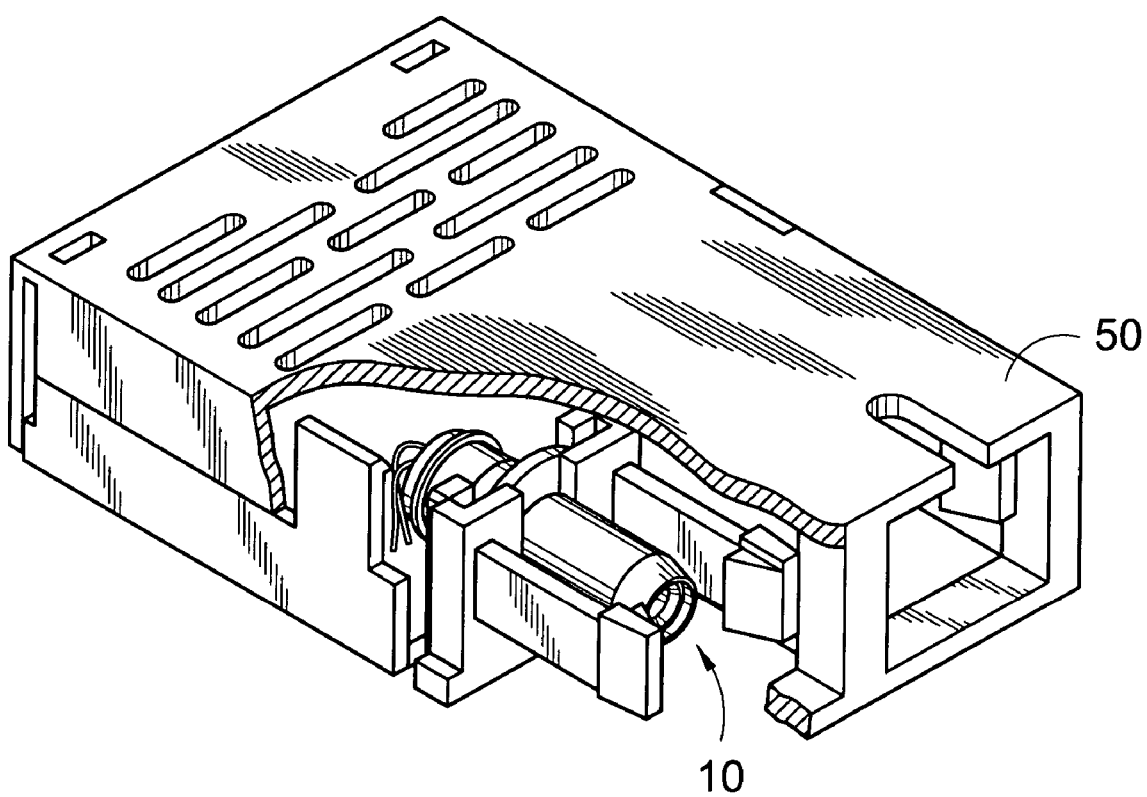
FIG. 5 is a perspective view about the package structure of the optical transceiver module of the present invention.

Referring to FIG. 5, the optical transceiver module 10 is packaged in a plastic body 50 for being used with a joint of an optical fiber.

Therefore the present invention can reduce the volume in the operation the optical fiber coupling and improve the coupling efficiency between optical fiber and optical detector. As a result, cost is reduced.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An optical transceiver module comprising: a sleeve, a base, and an adjustable toggle, the sleeve extending from the base and is inserted by an optical fiber, the base being formed with a receiving hole, wherein the toggle is coaxially arranged within the receiving hole; the toggle has a penetrating hole combining with an optical transceiver element; the toggle is installed with an annular flange adjusting the orientation of the optical transceiver element, wherein a spring is installed in the receiving hole so that the orientation of optical transceiver module is adjustable to any direction; thereby a light from a laser diode is precisely focused to a core of an optical fiber.

* * * * *